(12) United States Patent
Takahashi

(10) Patent No.: US 11,734,250 B2
(45) Date of Patent: Aug. 22, 2023

(54) INFORMATION PROCESSING APPARATUS, SYNCHRONIZATION CONTROL METHOD, AND COMPUTER-READABLE RECORDING MEDIUM RECORDING SYNCHRONIZATION CONTROL PROGRAM

(71) Applicant: FUJITSU LIMITED, Kawasaki (JP)

(72) Inventor: Akane Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 17/102,482

(22) Filed: Nov. 24, 2020

(65) Prior Publication Data

US 2021/0182264 A1 Jun. 17, 2021

(30) Foreign Application Priority Data

Dec. 12, 2019 (JP) ................................. 2019-224501

(51) Int. Cl.
*G06F 7/00* (2006.01)
*G06F 17/00* (2019.01)
(Continued)

(52) U.S. Cl.
CPC ...... *G06F 16/2308* (2019.01); *G06F 9/30087* (2013.01); *G06F 9/45558* (2013.01);
(Continued)

(58) Field of Classification Search
CPC ............. G06F 16/2308; G06F 9/30087; G06F 9/45558; G06F 9/52; G06F 16/27;
(Continued)

(56) References Cited

U.S. PATENT DOCUMENTS

2005/0204085 A1 9/2005 Fukuyama et al.
2010/0318197 A1* 12/2010 Matsui ............... G05B 19/0421
700/20
(Continued)

FOREIGN PATENT DOCUMENTS

JP 2003-131893 A 5/2003
JP 2005-258867 A 9/2005

OTHER PUBLICATIONS

Park, Daejun et al., "iJournaling: Fine-Grained Journaling for Improving the Latency of Fsync System Call," USENIX, The Advanced Computing Systems Association, This paper is included in the Proceedings of the 2017 USENIX Annual Technical Conference (USENIX ATC '17), Jul. 12-14, 2017, Santa Clara, CA, USA, pp. 787-798.

*Primary Examiner* — Tuan A Pham
(74) *Attorney, Agent, or Firm* — Fujitsu Patent Center

(57) ABSTRACT

An information processing apparatus includes: a memory; and a processor coupled to the memory and configured to: control execution of synchronization processing of data written along with operations of a plurality of processes; refer to the memory in which an allowable time at an execution time of first synchronization processing performed on synchronization target data written along with operations of the plurality of processes; calculate a first data amount for which an executing time of synchronization falls within the allowable time; and perform second synchronization processing on the synchronization target data in response to a fact that a second data amount of the synchronization target data has reached the first data amount.

8 Claims, 18 Drawing Sheets

(51) Int. Cl.
  *G06F 16/23* (2019.01)
  *G06F 9/30* (2018.01)
  *G06F 9/455* (2018.01)
  *G06F 16/27* (2019.01)
  *G06F 9/52* (2006.01)

(52) U.S. Cl.
  CPC ............... *G06F 9/52* (2013.01); *G06F 16/27* (2019.01); *G06F 2009/4557* (2013.01)

(58) Field of Classification Search
  CPC .......... G06F 2009/4557; G06F 9/4881; G06F 16/178; G06F 16/2358; G06F 16/273; G06F 16/275; G06F 16/113; G06F 16/13; G06F 16/40; G06F 16/254
  See application file for complete search history.

(56) References Cited

U.S. PATENT DOCUMENTS

2018/0077650 A1\* 3/2018 Nakahara .......... H04W 56/0015
2020/0364241 A1\* 11/2020 Stolze ................... G06F 16/275

\* cited by examiner

FIG. 15

| ITEM NUMBER | CONTAINER NAME | APPLICATION NAME | GROUP NAME | PRIORITY |
|---|---|---|---|---|
| 1 | CON-01 | APP-01 | Group-01 | 50 |
| 2 | CON-02 | APP-02 | Group-01 | 50 |
| 3 | CON-03 | APP-03 | Group-02 | 40 |
| 4 | CON-04 | APP-04 | Group-02 | 40 |
| 5 | CON-05 | APP-05 | Group-03 | 30 |
| 6 | CON-06 | APP-06 | Group-03 | 30 |
| 7 | CON-07 | APP-07 | Group-03 | 30 |
| ... | ... | ... | ... | ... |

FIG. 17

| ITEM NUMBER | INFORMATION NAME | TIME (MINUTE) |
|---|---|---|
| 1 | ALLOWABLE TIME INFORMATION | 30 |
| 2 | PREDICTED TIME INFORMATION | 10 |

FIG. 18

| ITEM NUMBER | INFORMATION NAME | DATA AMOUNT (GB) |
|---|---|---|
| 1 | ALLOWABLE DATA AMOUNT INFORMATION | 6 |
| 2 | LATEST DATA AMOUNT INFORMATION | 4.2 |

INFORMATION PROCESSING APPARATUS, SYNCHRONIZATION CONTROL METHOD, AND COMPUTER-READABLE RECORDING MEDIUM RECORDING SYNCHRONIZATION CONTROL PROGRAM

CROSS-REFERENCE TO RELATED APPLICATION

This application is based upon and claims the benefit of priority of the prior Japanese Patent Application No. 2019-224501, filed on Dec. 12, 2019, the entire contents of which are incorporated herein by reference.

FIELD

The embodiments discussed herein are related to an information processing apparatus, a synchronization control method, and a computer-readable recording medium.

BACKGROUND

For example, a business operator who provides a service to a user (hereinafter, simply also referred to as a business operator) constructs a business system used for providing the service. For example, the business operator constructs a business system using container-based virtualization technology, for example.

Related art is disclosed in Japanese Laid-open Patent Publication No. 2003-131893 and Japanese Laid-open Patent Publication No. 2005-258867.

SUMMARY

According to an aspect of the embodiments, an information processing apparatus includes: a memory; and a processor coupled to the memory and configured to: control execution of synchronization processing of data written along with operations of a plurality of processes; refer to the memory in which an allowable time at an execution time of first synchronization processing performed on synchronization target data written along with operations of the plurality of processes; calculate a first data amount for which an executing time of synchronization falls within the allowable time; and perform second synchronization processing on the synchronization target data in response to a fact that a second data amount of the synchronization target data has reached the first data amount.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram explaining a specific example of priority information;

FIG. 6 is a diagram explaining a specific example of the priority information;

FIG. 17 is a diagram explaining specific examples of allowable time information and the predicted time information; and FIG. 18 is a diagram explaining a specific example of allowable data amount information and latest data amount information.

DESCRIPTION OF EMBODIMENTS

When constructing such a business system, the business operator implements, for example, an infrastructure (hereinafter, also referred to as an I/O synchronization infrastructure) that performs processing of synchronizing data written by each process (hereinafter, also referred to as synchronization target data) with an external storage device.

In such an above business system, for example, a plurality of processes operating in different containers may use the same I/O synchronization infrastructure. As such, in the business system, for example, it becomes possible to collectively perform synchronization processing of data written by each process, and becomes possible to efficiently perform execution of synchronization processing with the storage device.

However, for example, in a case where an instruction to execute synchronization processing of data written by a certain process (for example, a process having a high priority) is given, such an I/O synchronization infrastructure may also execute synchronization processing of data written by another process together therewith. Therefore, depending on an amount of data written by each process, synchronization processing with the storage device may be delayed.

An information processing apparatus, a synchronization control method, and a synchronization control program capable of reducing a delay in synchronization processing of synchronization target data may be provided.

[Configuration of Information Processing System]

Figure 1:
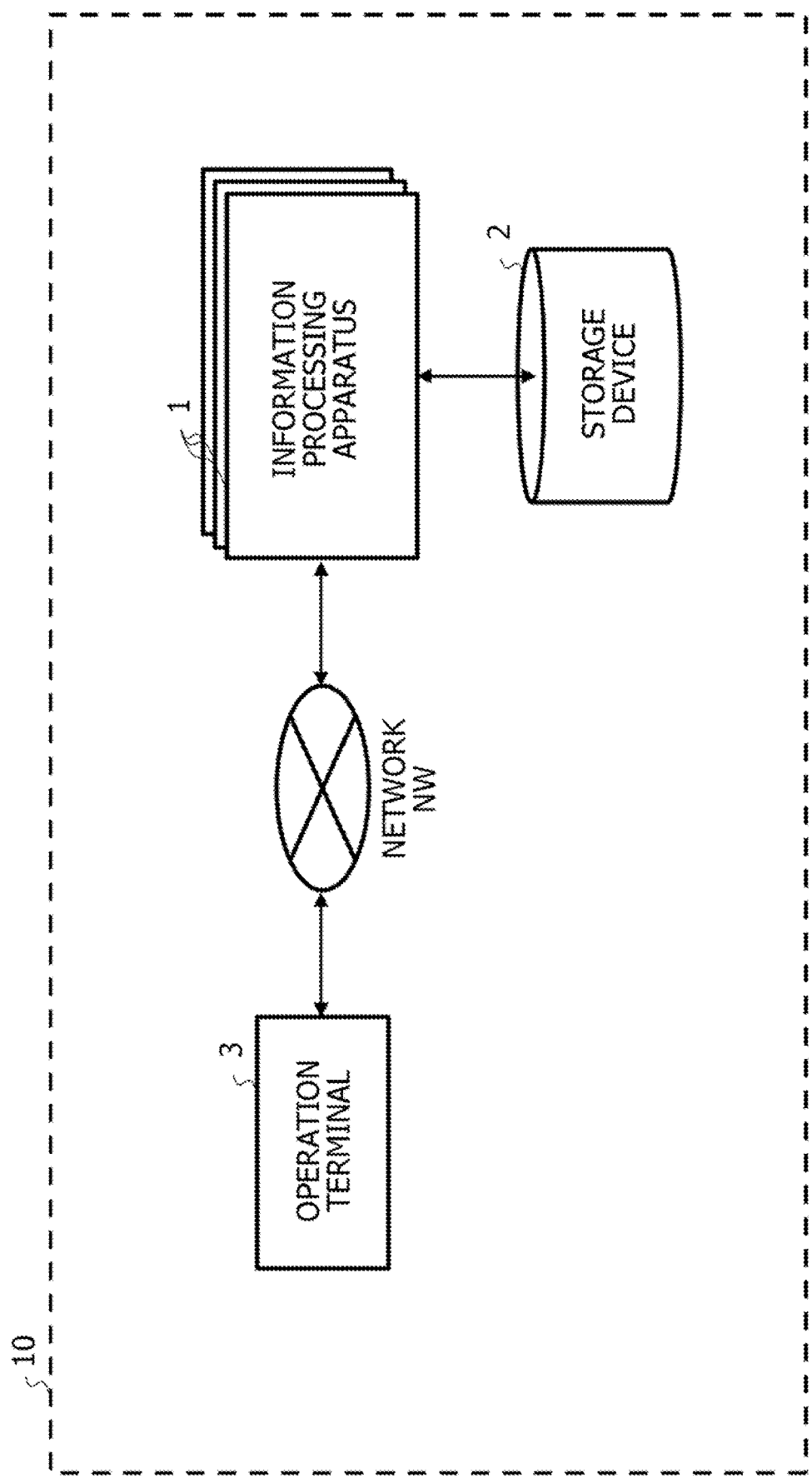
FIG. 1 is a diagram explaining a configuration of an information processing system.

First, a configuration of an information processing system 10 will be described, FIG. 1 is a diagram explaining a configuration of the information processing system 10.

The information processing system 10 illustrated in FIG. 1 includes an information processing apparatus 1, a storage device 2, and an operation terminal 3. The storage device 2 is, for example, a hard disk drive (HDD). The operation terminal 3 is a terminal through which a business operator inputs demanded information or the like, and is capable of accessing the information processing apparatus 1 via a network NW such as the Internet.

The information processing apparatus 1 includes one or more physical machines, and a business system for providing a service to a user is constructed. For example, in the information processing apparatus 1, a plurality of containers for implementing the container-based virtualization technology is deployed. In this case, for example, one or more applications that construct a business system each operate over each container. Over each container, for example, each micro service configuring one application operates.

In the information processing apparatus 1, an I/O synchronization infrastructure that performs synchronization processing between a page cache (hereinafter, also referred to as a first storage area), which is a storage destination of synchronization target data written along with execution of each application, and the storage device 2 (hereinafter, also referred to as a second storage area) is implemented.

[Specific Example of Processing in Synchronization Infrastructure]

Figure 2:
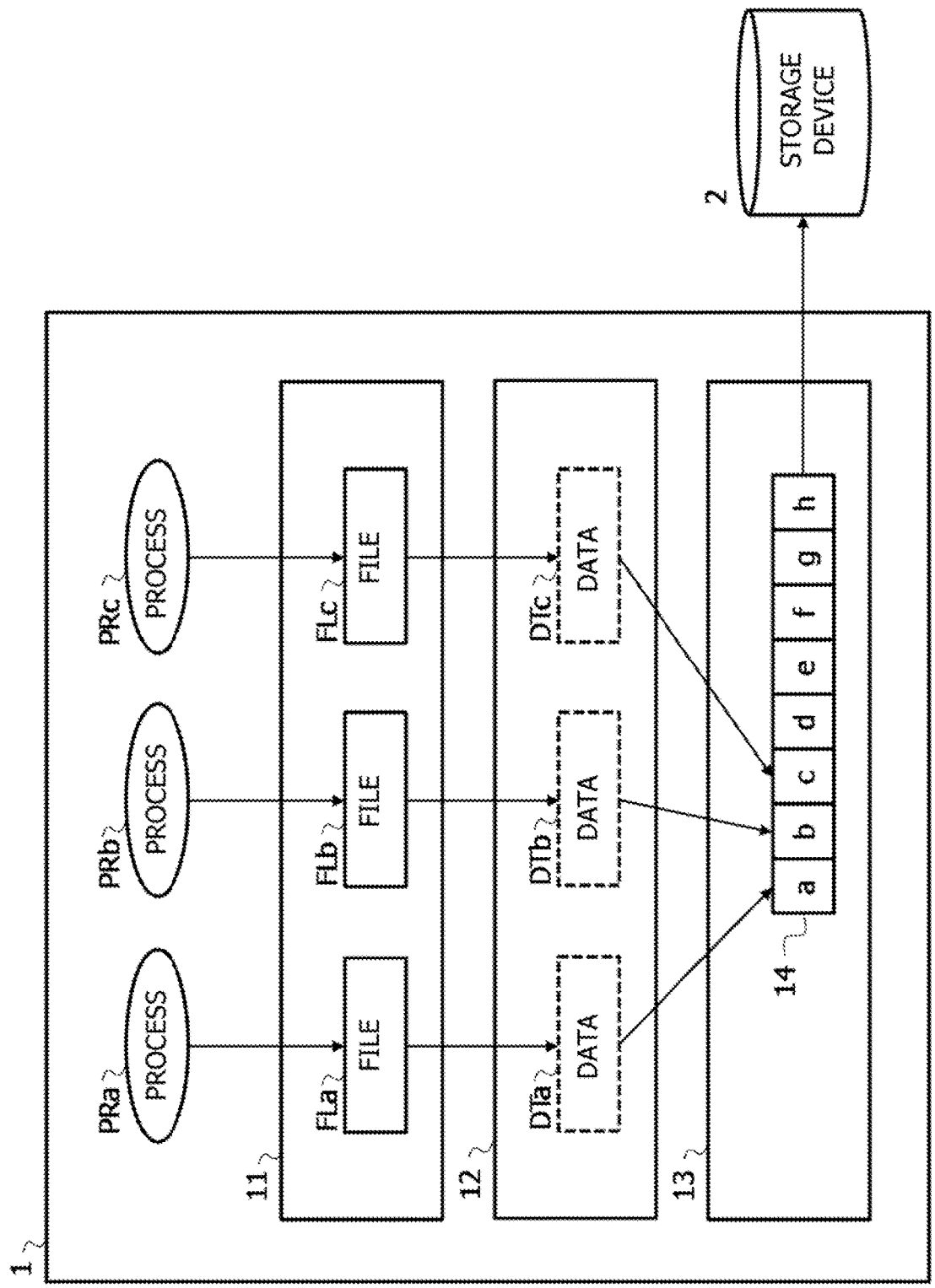
FIG. 2 is a diagram explaining a specific example of processing in an I/O synchronization infrastructure.
Figure 3:
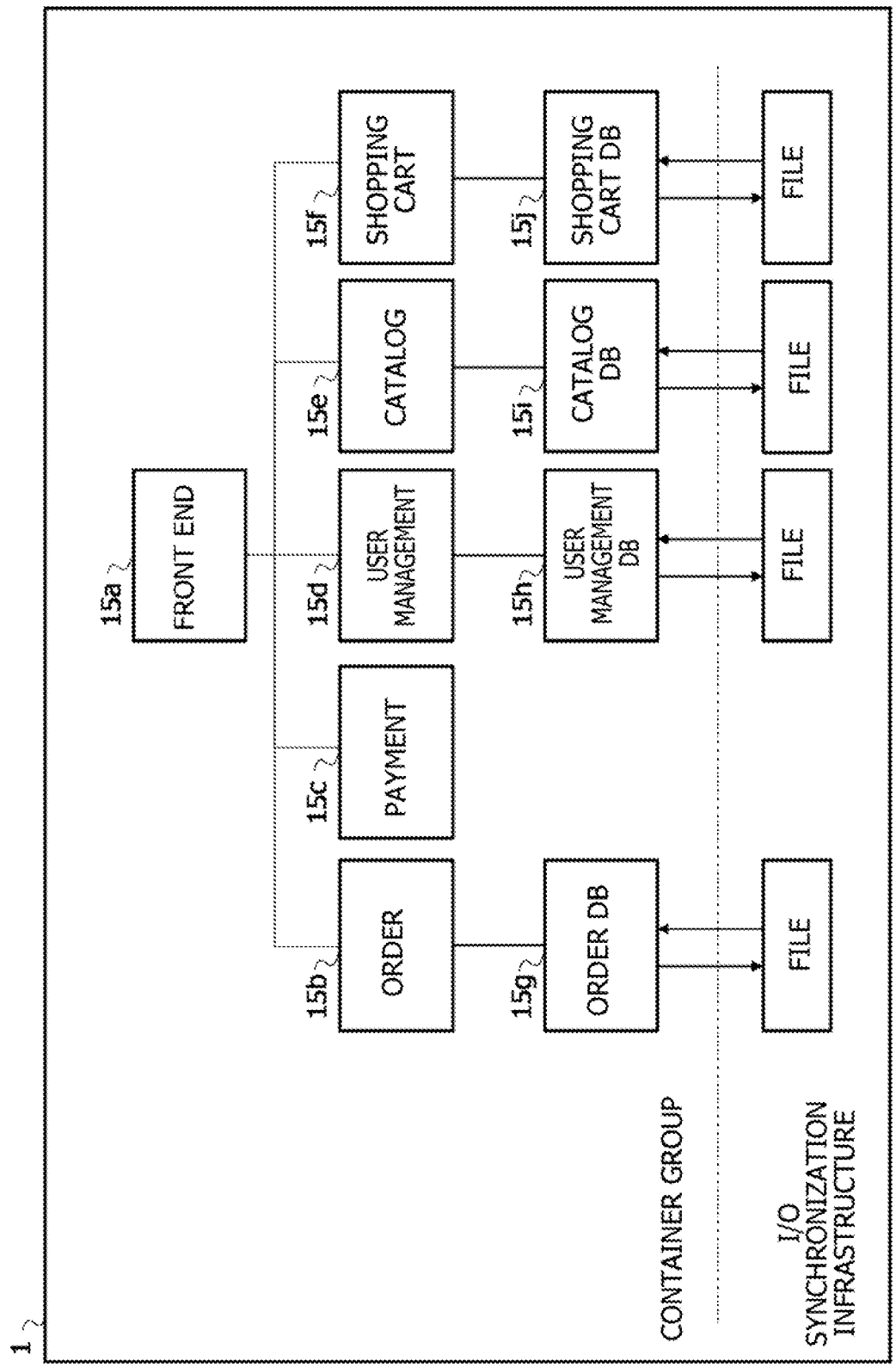
FIG. 3 is a diagram explaining a specific example of processing in the I/O synchronization infrastructure.

Next, a specific example of processing in the I/O synchronization infrastructure will be described. FIG. 2 to FIG. 3 are diagrams explaining specific examples of processing in the I/O synchronization infrastructure.

In the example illustrated in FIG. 2, an I/O synchronization infrastructure having a file system 11, a page cache 12, an I/O scheduler 13, and a queue 14 operates in the information processing apparatus 1.

As illustrated in FIG. 2, for example, in a case where a process PRa operating in the information processing apparatus 1 writes data to a file FLa, the file system 11 stores synchronization target data DTa written by the process PRa among data included in the file FLa in the page cache 12. For example, the I/O scheduler 13 stores the synchronization target data DTa stored in the page cache 12 in the first area (area corresponding to "a") in the queue 14.

For example, in a case where a process PRb operating in the information processing apparatus 1 writes data to a file FLb, the file system 11 stores synchronization target data DTb written by the process PRb among data included in the file FLb in the page cache 12. For example, the I/O scheduler 13 stores the synchronization target data DTb stored in the page cache 12 in the second area (area corresponding to "b") in the queue 14.

Similarly, for example, in a case where a process PRc operating in the information processing apparatus 1 writes data to a file FLc, the file system 11 stores synchronization target data DTc written by the process PRc among data included in the file FLc in the page cache 12. For example, the I/O scheduler 13 stores the synchronization target data DTc stored in the page cache 12 in the third area (area corresponding to "c") in the queue 14.

Thereafter, the I/O scheduler 13 stores the synchronization target data DTa, the synchronization target data DTb, and the synchronization target data DTc (hereinafter, also collectively referred to simply as synchronization target data DT), which are all the data stored in the queue 14, in the storage device 2.

For example, in the information processing apparatus 1, since a plurality of processes use the same I/O synchronization infrastructure, it is possible to efficiently store the synchronization target data DT in the storage device 2. A specific example in which a plurality of processes operating in different containers use the same I/O synchronization infrastructure will be described below.

[Specific Example of I/O Synchronization Infrastructure]

FIG. 3 is a diagram illustrating a specific example in a case where a plurality of processes each operating in different containers use the same I/O synchronization infrastructure.

In the information processing apparatus 1 illustrated in FIG. 3, the micro service operating in each container cooperatively performs processing to function as one application.

For example, in the information processing apparatus 1 illustrated in FIG. 3, a container 15a in which a micro service having a front-end function operates, a container 15b in which a micro service having an ordering function operates, a container 15c in which a micro service having a payment function operates, and a container 15d in which a micro service having a user management function operates are deployed. In the information processing apparatus 1 illustrated in FIG. 3, a container 15e in which a micro service having a catalog function operates, a container 15f in which a micro service having a shopping cart function operates, a container 15g in which a micro service having an order database (DB) function operates, and a container 15h in which a micro service having a user management DB function operates are deployed. In the information processing apparatus 1 illustrated in FIG. 3, a container 15i in which a micro service having a catalog DB function operates and a container 15j in which a micro service having a shopping cart DB function operates are deployed.

In the example illustrated in FIG. 3, the container 15g, the container 1511, the container 15i, and the container 15j share an I/O synchronization infrastructure for performing the synchronization processing of data.

This makes it possible for the information processing apparatus 1 to efficiently perform the synchronization processing with the storage device 2.

Figure 4A:
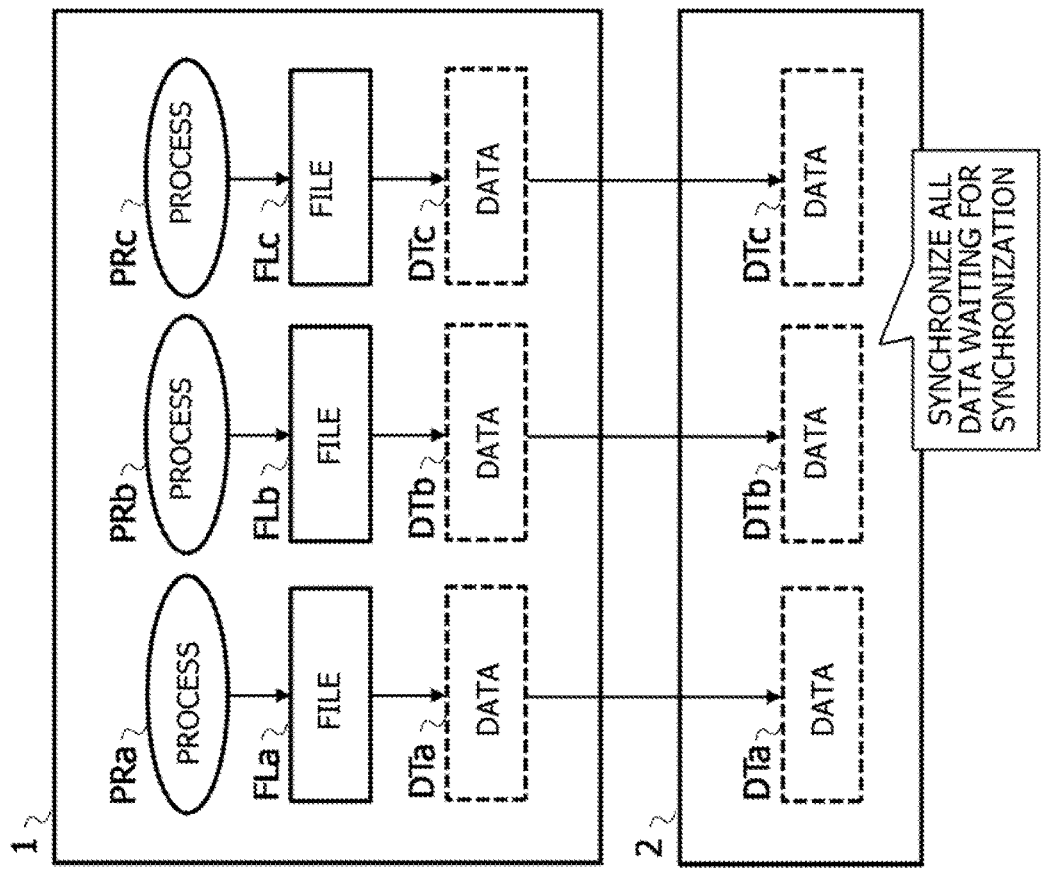
FIGS. 4A and 4B are diagrams explaining a specific example of processing in the I/O synchronization infrastructure.
Figure 4B:
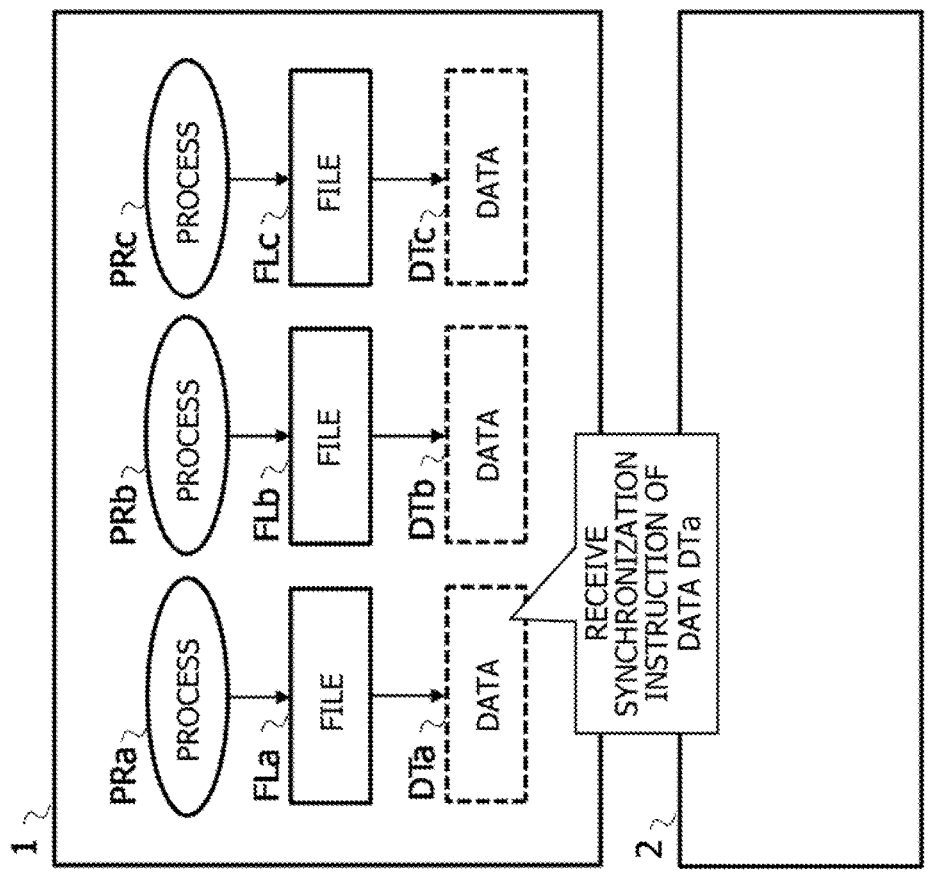

The I/O synchronization infrastructure described with reference to FIG. 3 and the like may perform the synchronization processing of all the synchronization target data DT as illustrated in FIG. 4B even in a case where an instruction to perform the synchronization processing of the synchronization target data DTa as illustrated in FIG. 4A is given, for example, Therefore, depending on the data amount of the synchronization target data DT stored in the page cache 12, the synchronization processing of the synchronization target data DTa (given instruction on synchronization processing) may be delayed.

The information processing apparatus 1 according to the present embodiment refers to a storage unit that stores an allowable time at an execution time of the synchronization processing (hereinafter, also referred to as first synchronization processing) performed on the synchronization target data DT written along with the operations of the plurality of processes and calculates a data amount (hereinafter, also referred to as an allowable data amount or a first data amount) for which an executing time of the synchronization falls within the allowable time. The first synchronization processing is, for example, synchronization processing performed in response to an instruction to perform the first synchronization processing by one of the processes operating in the information processing apparatus 1.

The information processing apparatus 1 performs synchronization processing (hereinafter, also referred to as second synchronization processing) on the synchronization target data DT in response to a fact that a data amount (hereinafter, also referred to as a latest data amount or a second data amount) of the synchronization target data DT written along with the operations of the plurality of processes has reached the allowable data amount.

For example, the information processing apparatus 1 performs the second synchronization processing for the purpose of suppressing an increase in the data amount of the synchronization target data DT in addition to the first synchronization processing performed on all the synchronization target data DT. For example, when detecting that the latest data amount of the synchronization target data DT has reached the allowable data amount, the information processing apparatus 1 performs the second synchronization processing prior to the first synchronization processing.

This makes it possible for the information processing apparatus 1 to reduce a delay in the synchronization processing (first synchronization processing) for the synchronization target data DT.

[Hardware Configuration of Information Processing System]

Figure 5:
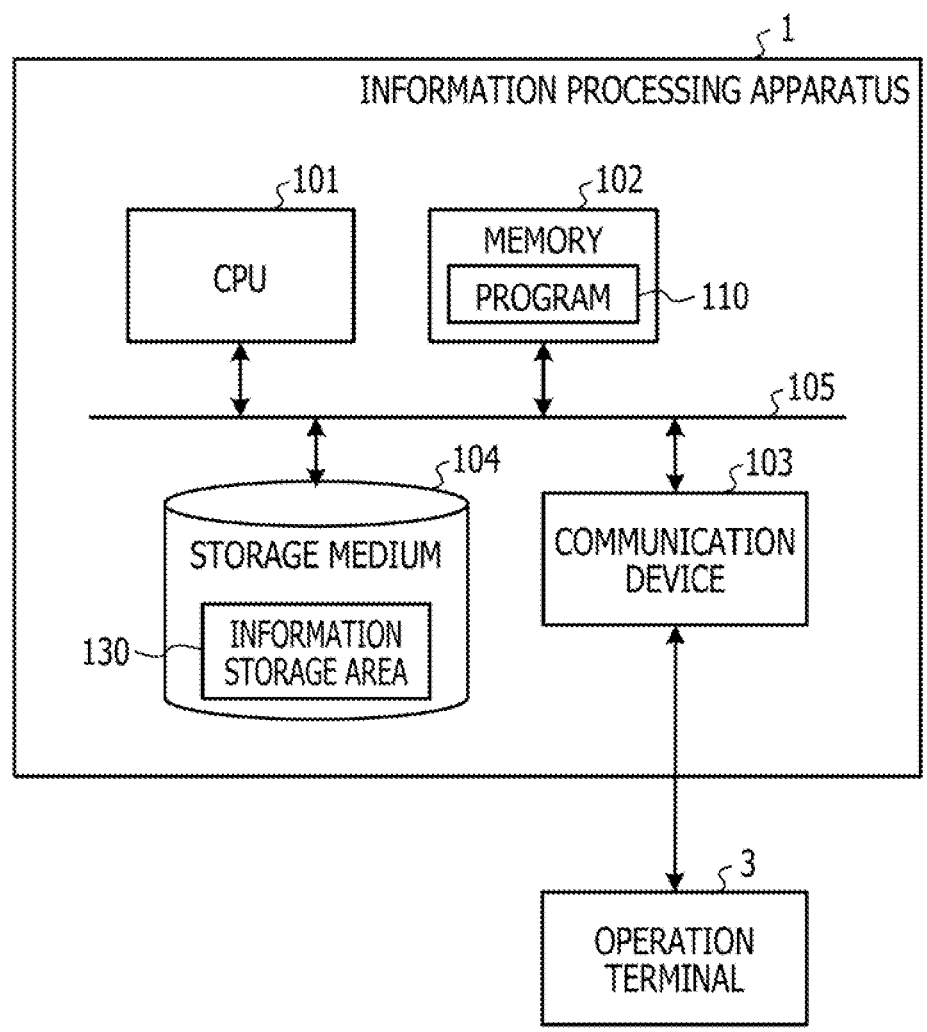
FIG. 5 is a diagram explaining a hardware configuration of an information processing apparatus.

Next, a hardware configuration of the information processing system 10 will be described. FIG. 5 is a diagram explaining a hardware configuration of the information processing apparatus 1.

As illustrated in FIG. 5, the information processing apparatus 1 includes a CPU 101 serving as a processor, a memory 102, a communication device 103, and a storage medium 104. These components are coupled to one another via a bus 105.

The storage medium 104 includes, for example, a program storage area (not illustrated) that stores a program 110 for performing processing of controlling synchronization of the synchronization target data DT (hereinafter, also referred to as synchronization control processing). The storage medium 104 also includes, for example, a storage unit 130 (hereafter also referred to as an information storage area 130) that stores information for use in performing the synchronization control processing. The storage medium 104 may be, for example, an HDD or a solid-state drive (SSD).

The CPU 101 executes the program 110 loaded from the storage medium 104 into the memory 102 to perform the synchronization control processing.

The communication device 103 performs communication with the operation terminal 3 via the network NW, for example.

[Functions of Information Processing System]

Figure 6:
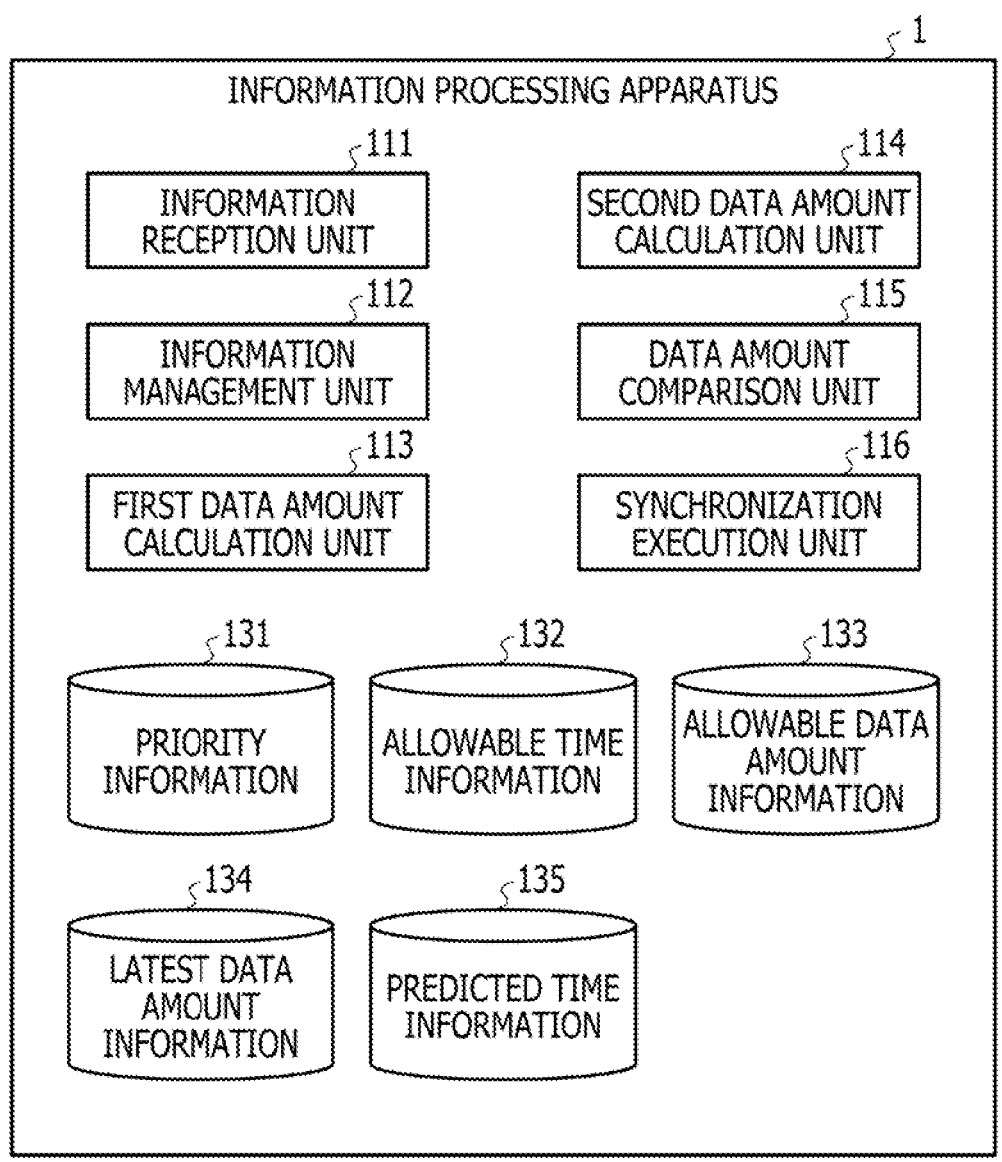
FIG. 6 is a block diagram of a function of the information processing apparatus.

Functions of the information processing system 10 will be described. FIG. 6 is a block diagram of functions of the information processing apparatus 1.

As illustrated in FIG. 6, the information processing apparatus 1 implements various functions including an information reception unit 111, an information management unit 112, a first data amount calculation unit 113, a second data amount calculation unit 114, a data amount comparison unit 115, and a synchronization execution unit 116 by the hardware such as the CPU 101, the memory 102, and the like and the program 110 organically cooperating with each other.

For example, as illustrated in FIG. 6, the information processing apparatus 1 stores priority information 131, allowable time information 132, allowable data amount information 133, latest data amount information 134, and predicted time information 135 in the information storage area 130.

The information reception unit 111 also receives, for example, various information input by the business operator via the operation terminal 3.

For example, the information management unit 112 generates the priority information 131, the allowable time information 132, and the predicted time information 135 based on the various types of information received by the information reception unit 111, and stores the generated information in the information storage area 130.

The priority information 131 is, for example, information indicating the priority of each container deployed in the information processing apparatus 1.

The allowable time information 132 is information indicating an allowable time at an execution time of a plurality of inseparable processing (hereinafter, also referred to as a first transaction) including write processing to the memory 102 (page cache) along with an operation of a process having a high priority and the first synchronization processing on synchronization target data DT written along with the operation of each process (each process using the same I/O synchronization infrastructure) including the process having a high priority.

The predicted time information 135 is information indicating a predicted time at an execution time of a plurality of inseparable processing (hereinafter, also referred to as a second transaction) including the write processing to the memory 102 along with the operation of the process having a high priority and a first synchronization processing for the synchronization target data DT written along with the operation of the process having a high priority. For example, the predicted time information 135 is the predicted time at the execution time of the first transaction in the case where only the synchronization target data DT written along with the operation of the process having the high priority is present.

The first data amount calculation unit 113 refers to the allowable time information 132 stored in the information storage area 130, and calculates an amount of data that may be synchronized in the time indicated by the allowable time information 132. The information management unit 112 stores, for example, the allowable data amount information 133 indicating the data amount calculated by the first data amount calculation unit 113 in the information storage area 130.

For example, the second data amount calculation unit 114 refers to the synchronization target data DT stored in the memory 102, thereby specifying a current data amount of the synchronization target data DT written in the memory 102 along with the operation of each process. For example, the second data amount calculation unit 114 specifies the current data amount of the synchronization target data DT in which the synchronization with the storage device 2 is not performed yet among the synchronization target data DT written in the memory 102 along with the operation of each process. Then, the information management unit 112 stores, for example, the latest data amount information 134 indicating the data amount specified by the second data amount calculation unit 114 in the information storage area 130.

The data amount comparison unit 115 compares a data amount corresponding to the allowable data amount information 133 stored in the information storage area 130 with a data amount corresponding to the latest data amount information 134 stored in the information storage area 130.

In a case where the data amount comparison unit 115 determines that the data amount corresponding to the latest data amount information 134 has reached the data amount corresponding to the allowable data amount information 133, the synchronization execution unit 116 performs the second synchronization processing on the synchronization target data DT.

Outline of First Embodiment

Figure 7:
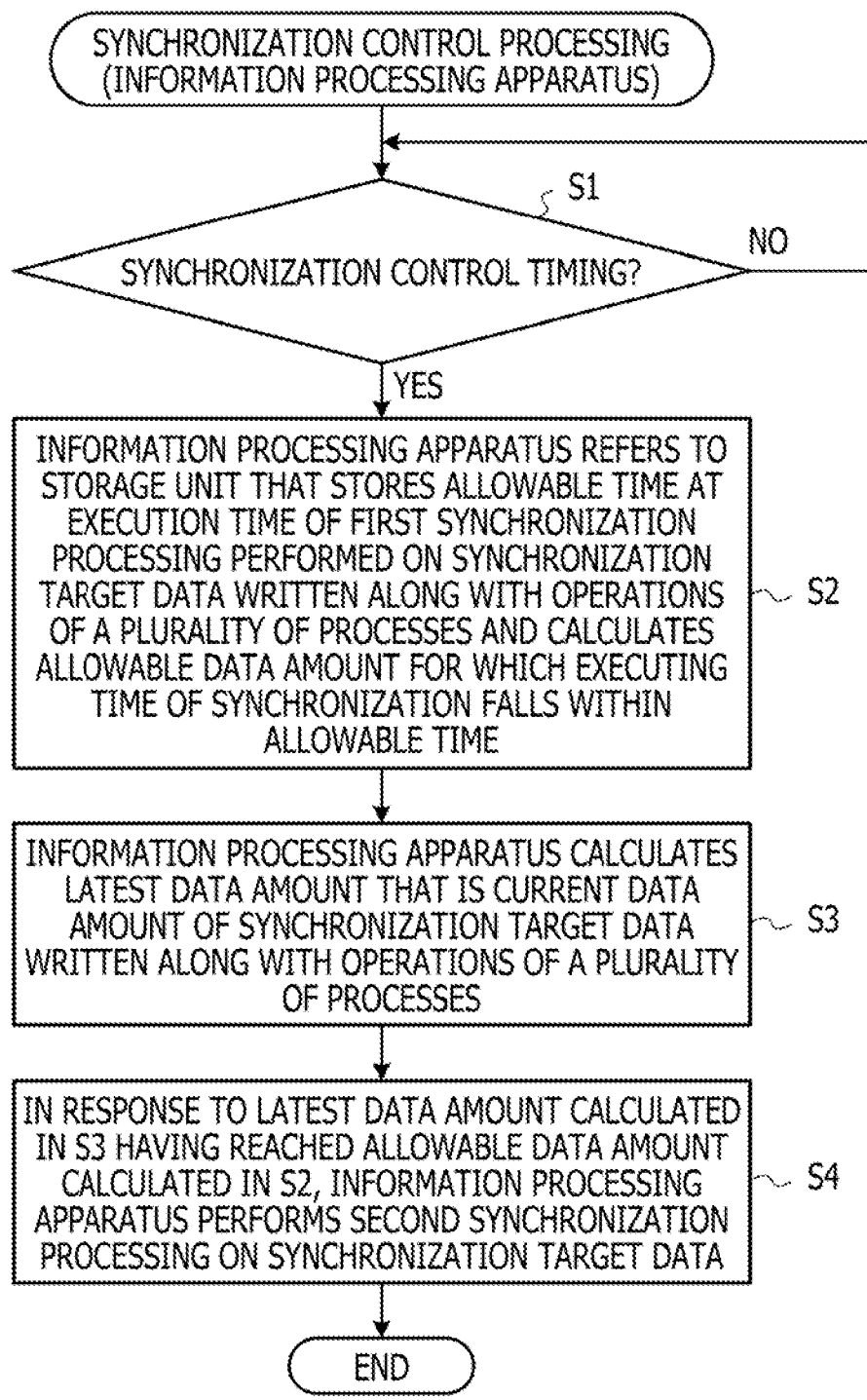
FIG. 7 is a flowchart diagram explaining outline of synchronization control processing in a first embodiment.
Figure 8:
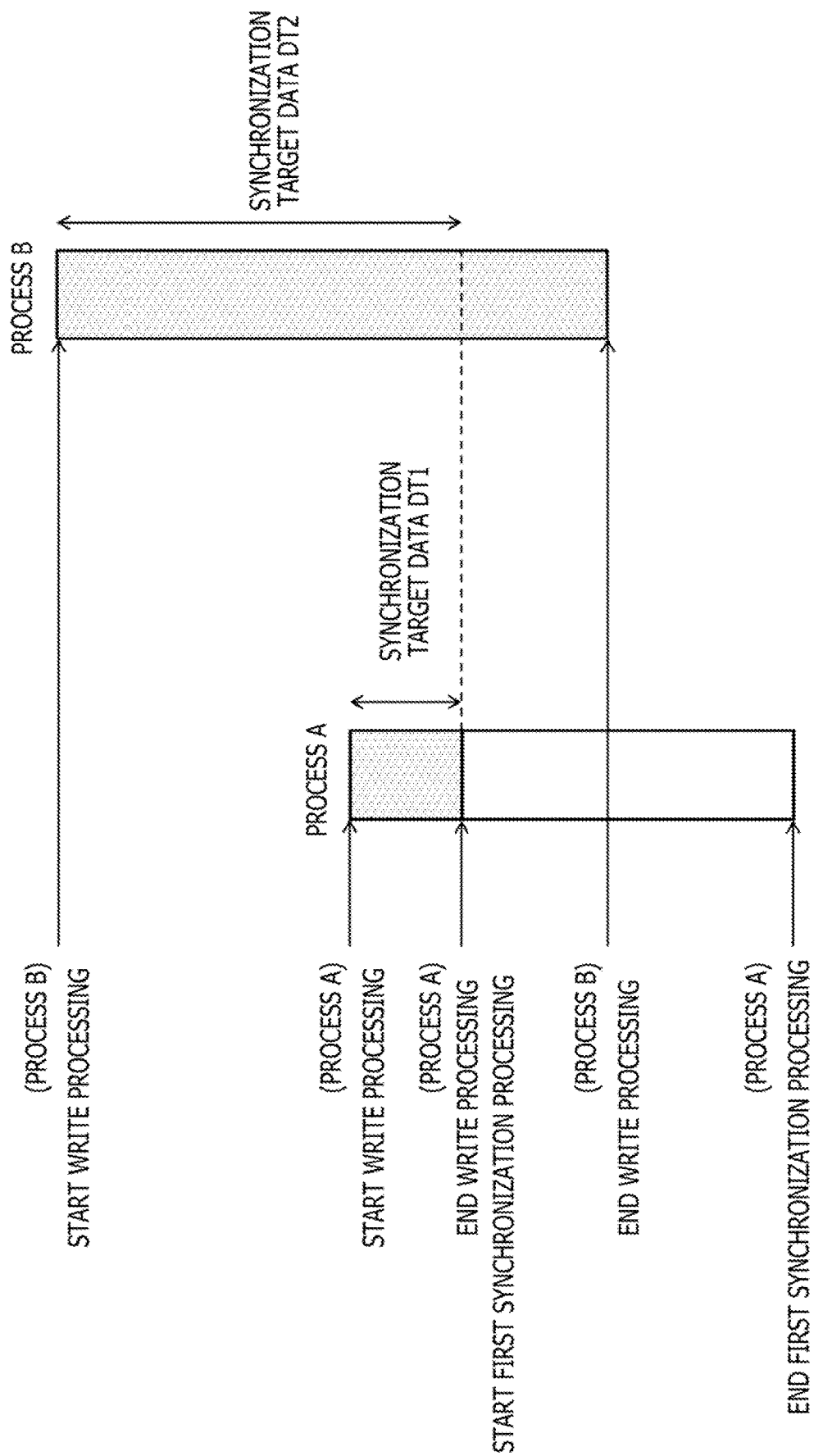
FIG. 8 is a diagram explaining an outline of the synchronization control processing in the first embodiment.
Figure 9:
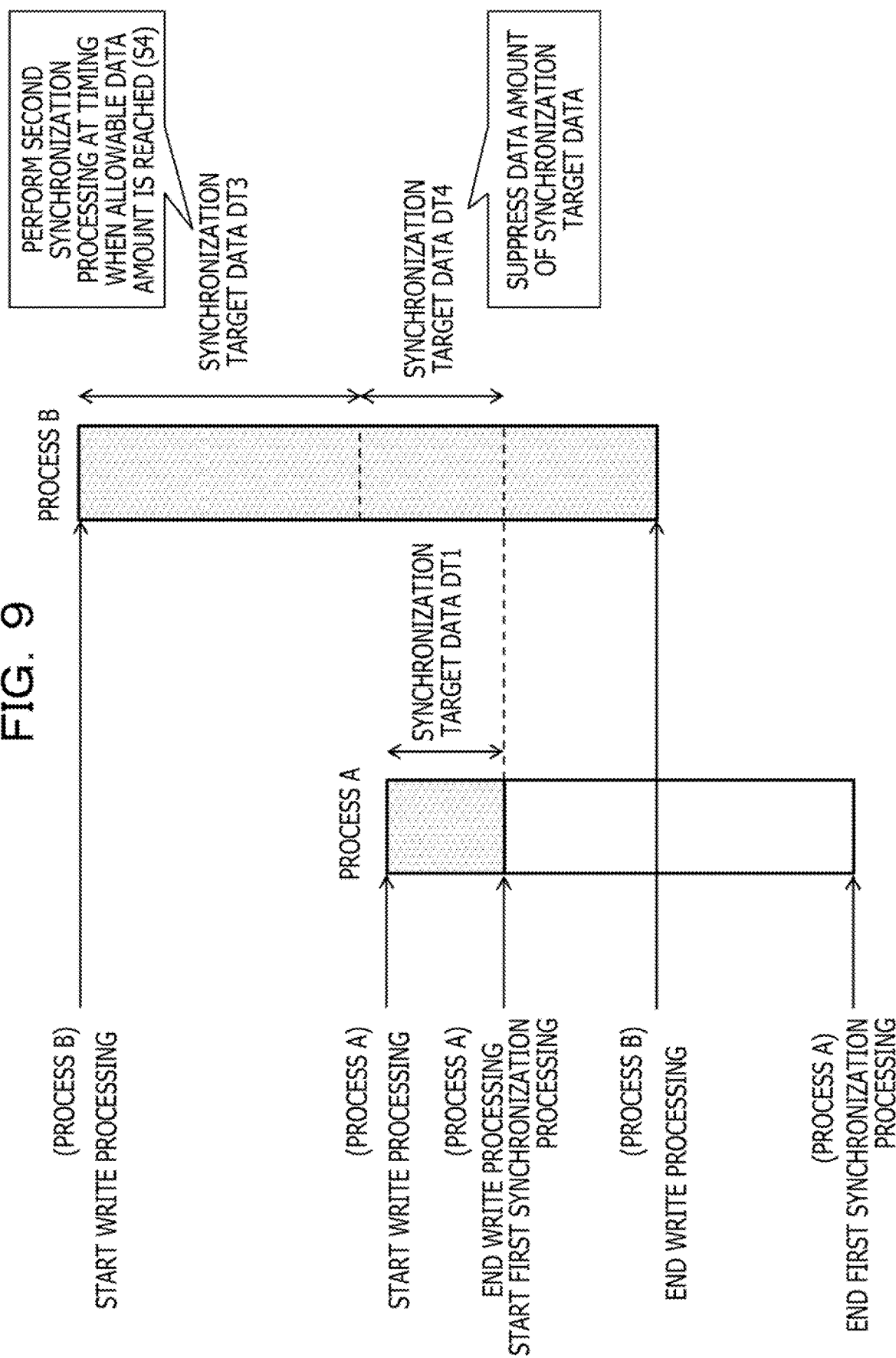
FIG. 9 is a diagram explaining an outline of the synchronization control processing in the first embodiment.
Figure 10:
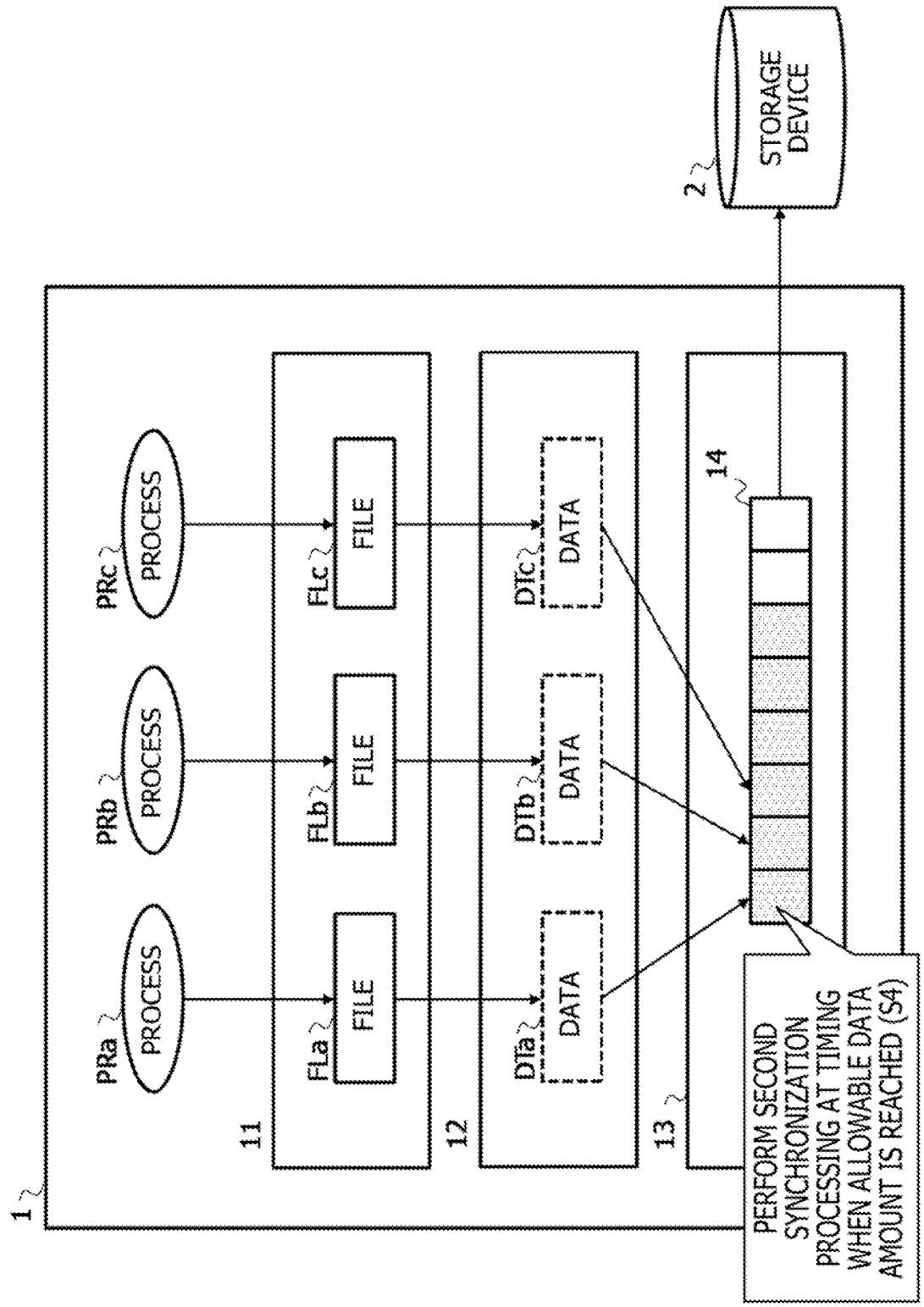
FIG. 10 is a diagram explaining an outline of the synchronization control processing in the first embodiment.

An outline of a first embodiment will be described. FIG. 7 is a flowchart diagram explaining the outline of synchronization control processing in this first embodiment. FIG. 8 to FIG. 10 are diagrams for explaining the outline of the synchronization control processing in the first embodiment.

As illustrated in FIG. 7, the information processing apparatus 1 waits until a synchronization control timing occurs (NO in S1). The synchronization control timing may be, for example, a periodic timing such as every 10 minutes.

In a case where the synchronization control timing comes (YES in S1), the information processing apparatus 1 refers to the information storage area 130 in which the allowable time at the execution time of the first synchronization processing performed on the synchronization target data DT written along with the operation of the plurality of processes (the plurality of processes using the same I/O synchronization infrastructure) is stored, and calculates the allowable data amount for which the executing time of the synchronization falls within the allowable time (S2).

The information processing apparatus 1 calculates the latest data amount that is the current data amount of the synchronization target data DT written along with the operations of the plurality of processes (S3).

Thereafter, the information processing apparatus 1 performs the second synchronization processing on the synchronization target data DT in response to a fact that the latest data amount calculated in the processing of S3 has reached the allowable data amount calculated in the processing of S2 (S4).

For example, the information processing apparatus 1 executes the second synchronization processing for the purpose of suppressing an increase in the data amount of the synchronization target data DT in addition to the first synchronization processing for the synchronization target data DT written along with the operations of the plurality of processes using the same I/O synchronization infrastructure. Hereinafter, a relationship between the first synchronization processing and the second synchronization processing will be described.

[Relationship Between First Synchronization Processing and Second Synchronization Processing]

FIG. 8 to FIG. 10 are diagrams illustrating the relationship between the first synchronization processing and the second synchronization processing. In FIG. 8 and FIG. 9, shaded portions correspond to the write processing, and white portions correspond to the first synchronization processing.

For example, in a case where the second synchronization processing is not performed, the information processing apparatus 1 performs synchronization of all the synchronization target data DT (synchronization target data DT1 and synchronization target data DT2) in the first synchronization processing as illustrated in FIG. 8. Therefore, in this case, the data amount of the synchronization target data DT to be synchronized in the first synchronization processing increases, and an end time of the first synchronization processing is delayed.

On the other hand, for example, in a case where the first synchronization processing and the second synchronization processing are performed, the information processing apparatus 1 performs the second synchronization processing on synchronization target data DT3 in advance as illustrated in FIG. 9 and FIG. 10, whereby it is possible to suppress the data amount of the synchronization target data DT (synchronization target data DT1 and synchronization target data DT4) to be synchronized in the first synchronization processing.

Therefore, in the information processing apparatus 1, it is possible to suppress the occurrence of the delay in the first synchronization processing by performing the first synchronization processing and the second synchronization processing together.

Details of First Embodiment

Next, the first embodiment will be described in detail. FIG. 11 to FIG. 14 are flowchart diagrams explaining the synchronization control processing in the first embodiment in detail. FIG. 15 to FIG. 18 are diagrams explaining in detail the synchronization control processing in the first embodiment.

[Information Management Processing]

Figure 11:
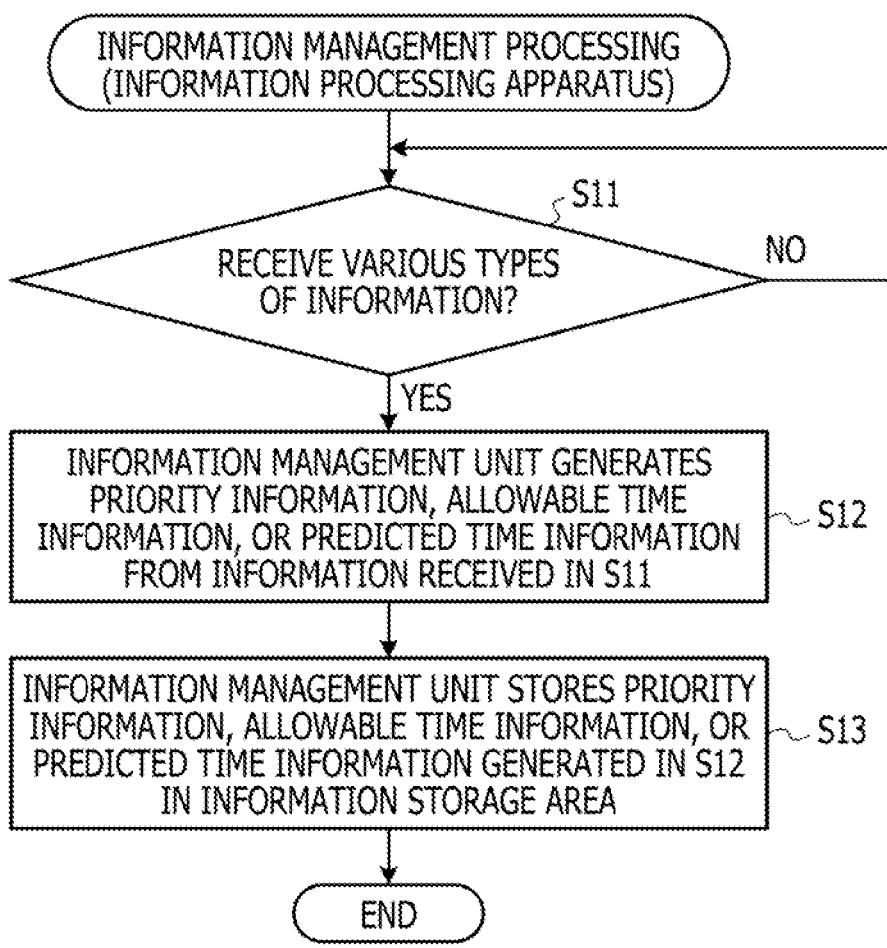
FIG. 11 is a flowchart diagram explaining the synchronization control processing in the first embodiment in detail.

First, processing of managing various types of information (hereinafter, also referred to as an information management processing) in the synchronization control processing will be described FIG. 11 is a flowchart diagram for explaining the information management processing.

As illustrated in FIG. 11, the information reception unit 111 of the information processing apparatus 1 waits until receiving one of various types of information transmitted from the operation terminal 3, for example (NO in S11). For example, the information reception unit 111 waits until receiving information to be used for generating the priority information 131, the allowable time information 132, or the predicted time information 135.

In a case where one of various types of information is received (YES in S11), the information management unit 112 of the information processing apparatus 1 generates the priority information 131, the allowable time information 132, or the predicted time information 135 from the information received in the processing of S11 (S12).

Thereafter, the information management unit 112 stores the priority information 131, the allowable time information 132, or the predicted time information 135 generated in the processing of S12 in the information storage area 130. Specific examples of the priority information 131, the allowable time information 132, and the predicted time information 135 will be described below.

[Specific Example of Priority Information]

Figure 16:
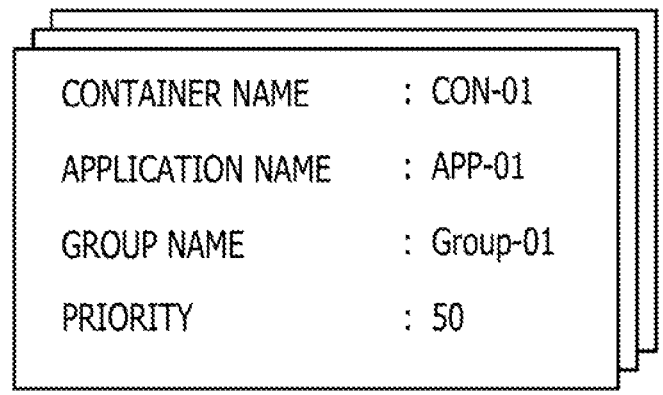

First, a specific example of the priority information 131 will be described. FIG. 15 and FIG. 16 are diagrams explaining a specific example of priority information 131.

The priority information 131 illustrated in FIG. 15 includes, as an item, an "item number" in which identification information of each piece of information included in the priority information 131 is set, a "container name" in which a name of each container is set, and an "application name" in which a name of each application is set. The priority information 131 illustrated in. FIG. 15 includes, as the item, a "group name" in which a name of a group obtained by classifying containers by priority is set and a "priority" in which a priority of each group is set. In the following description, it is assumed that the maximum value set as the "priority" is "50".

For example, "CON-01" is set as the "container name" and "APP 01" is set as the "application name" in the information having the "item number" of "1". "CON-02" is set as the "container name" and "APP-02" is set as the "application name" in the information having the "item number" of "2". "Group-01" and "50" are set in the "group name" and the "priority", respectively, of the information having the "item number" of "1" and "2".

For example, the information having the "item number" of "1" and "2" indicates that the priority of the container having the container name of "CON-01" or "CON-02" is "50".

On the other hand, "CON-03" is set as the "container name" and "APP-03" is set as the "application name" in the information having the "item number" of "3". "CON-04" is set as the "container name" and "APP-04" is set as the "application name" in the information having the "item number" of "4". "Group-02" and "40" are set in the "group name" and the "priority" of the information having the "item number" of "3" and "4", respectively.

For example, the information having "item number" of "3" and "4" indicates that the priority of the container having the container name of "CON-03" or "CON-04" is "40". Descriptions of another information included in FIG. 15 will be omitted.

As illustrated in FIG. 16, the priority information 131 may be included in a part of a setting file of each container, for example.

For example, the setting file illustrated in FIG. 16 is a setting file of the container in which the "container name" is "CON-01", and indicates that the "group name" and the "priority" of a group including the container having the "container name" of "CON-01" are "Group-01" and "50", respectively.

[Specific Example of Allowable Time Information and Predicted Time Information]

Next, a specific example of the allowable time information 132 and the predicted time information 135 will be described. FIG. 17 is a diagram explaining a specific example of the allowable time information 132 and the predicted time information 135.

The information illustrated in FIG. 17 includes, as the item, an "item number" in which identification information of each piece of information is set, an "information name" in which a name of each piece of information is set, and a "time" in which a time corresponding to each piece of information is set.

For example, in the information illustrated in FIG. 17, "allowable time information" is set as the "information name" and" 30 (minutes)" is set as the "time" in the information having the "item number" of "1". For example, information having the "item number" of "1" corresponds to the allowable time information 132.

In the information illustrated in FIG. 17, "predicted time information" is set as the "information name" and "10 (minutes)" is set as the "time" in the information having the "item number" of "2". For example, information having the "item number" of "2" corresponds to, for example, the predicted time information 135.

The allowable time information 132 and the predicted time information 135 may be calculated based on, for example, the time taken when the first synchronization processing for the synchronization target data DT was performed in the past.

For example, the information management unit 112 specifies the first synchronization processing in which various types of errors (for example, an error indicating that the execution end time is significantly delayed) are not output at the execution time, for example, among the first synchronization processing performed in the past. For example, the information management unit 112 may specify information indicating the longest time among time taken to execute the specified first synchronization processing as the allowable time information 132.

In addition, for example, the information management unit 112 may specify information indicating an average of time taken for synchronization of the synchronization target data DT written along with the operation of the process having a high priority as the predicted time information 135 in the first synchronization processing performed in the past.

This makes it possible for the information processing apparatus 1 to automatically calculate the allowable time information 132 and the predicted time information 135.

[First Data Amount Calculation Processing]

Figure 12:
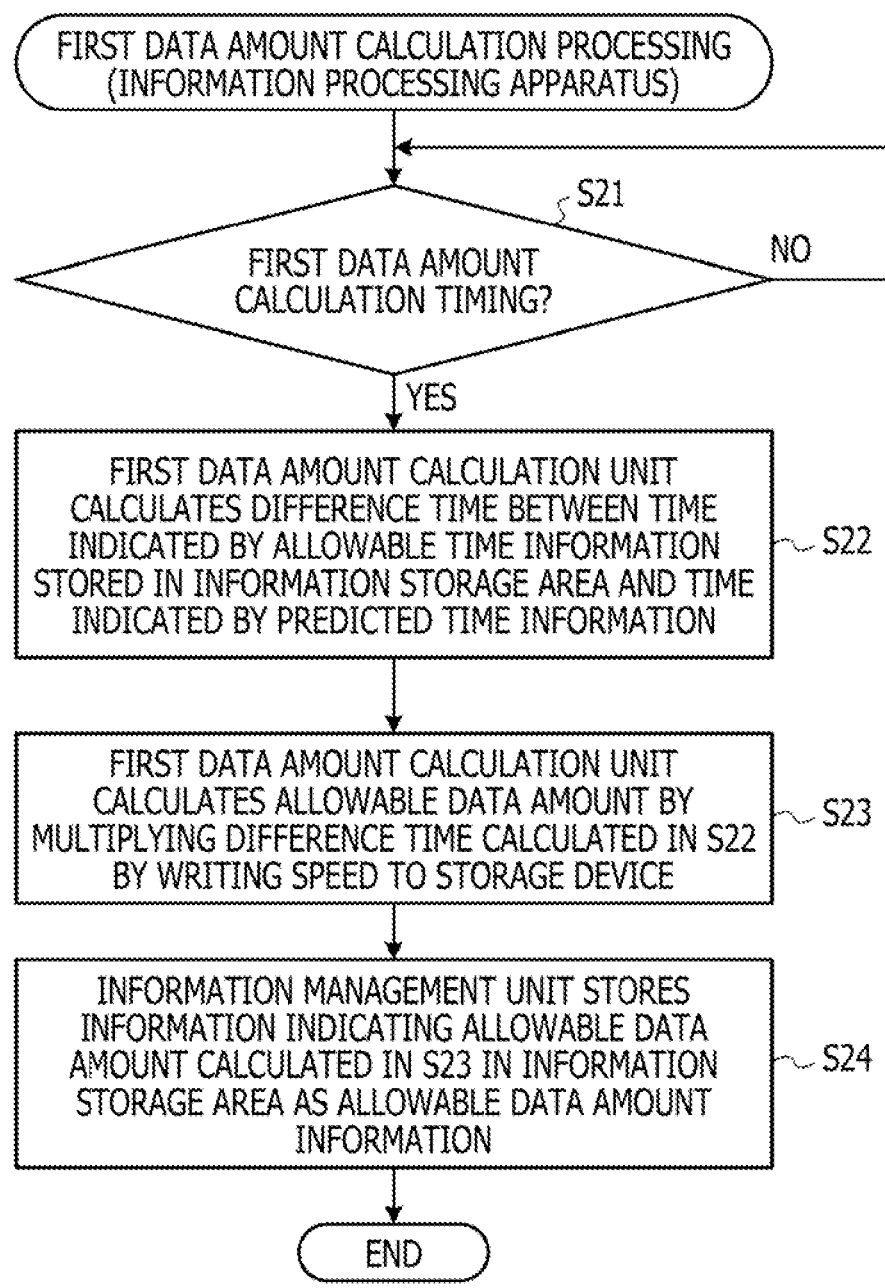
FIG. 12 is a flowchart diagram explaining the synchronization control processing in the first embodiment in detail.

Next, processing of calculating the allowable data amount (hereinafter, also referred to as a first data amount calculation processing) in the synchronization control processing will be described. FIG. 12 is a flowchart diagram explaining first data amount calculation processing.

As illustrated in FIG. 12, the first data amount calculation unit 113 of the information processing apparatus 1 waits until the first data amount calculation timing (NO in S21). The first data amount calculation timing may be, for example, a timing at which a new container is deployed in the information processing apparatus 1 or a timing at which the container deployed in the information processing apparatus 1 is deleted.

In a case where the first data amount calculation timing arrives (YES in S21), the first data amount calculation unit 113 calculates a difference time between the time indicated by the allowable time information 132 stored in the information storage area 130 and the time indicated by the predicted time information 135 (S22).

For example, in the information described with reference to FIG. 17, "30 (minutes)" is set in the "time" of the information in which the "information name" is the "allowable time information" (the information having the "item number" of "1"). In the information described in FIG. 17, "10 (minutes)" is set in the "time" of the information in which the "information name" is the "predicted time information" (information having the "item number" of "2"). For example, the first data amount calculation unit 113 calculates "20 (minutes)" by subtracting "10 (minutes)", which is the time indicated by the predicted time information 135, from "30 (minutes)", which is the time indicated by the allowable time information 132.

After that, the first data amount calculation unit 113 calculates the allowable data amount by multiplying the difference time calculated in the processing of S22 by a writing speed of data (write processing speed) with respect to the storage device 2 (S23). The information management unit 112 stores, for example, information indicating the allowable data amount calculated in the processing of S23 in the information storage area 130 as the allowable data amount information 133 (S24).

For example, the first data amount calculation unit 113 calculates the allowable data amount according to the following Equation (1), for example.

$$D_{f\_max}=(T_{tx\_max}-T_{tx})*P_f \qquad (1)$$

In Equation (1), $D_{f\_max}$ represents the allowable data amount, $T_{t}$ represents the time indicated by the predicted time information 135, $T_{tx\_max}$ represents the time indicated by the allowable time information 132, and $P_f$ represents the writing speed of data with respect to the storage device 2.

For example, for example, in a case where the difference time calculated in the processing of S22 is "20 (minutes)" and the writing speed of data with respect to the storage device 2 is "5 (MB/s)", for example, the first data amount calculation unit 113 calculates information indicating "6 (GB)" as the allowable data amount.

[Second Data Amount Calculation. Processing]

Figure 13:
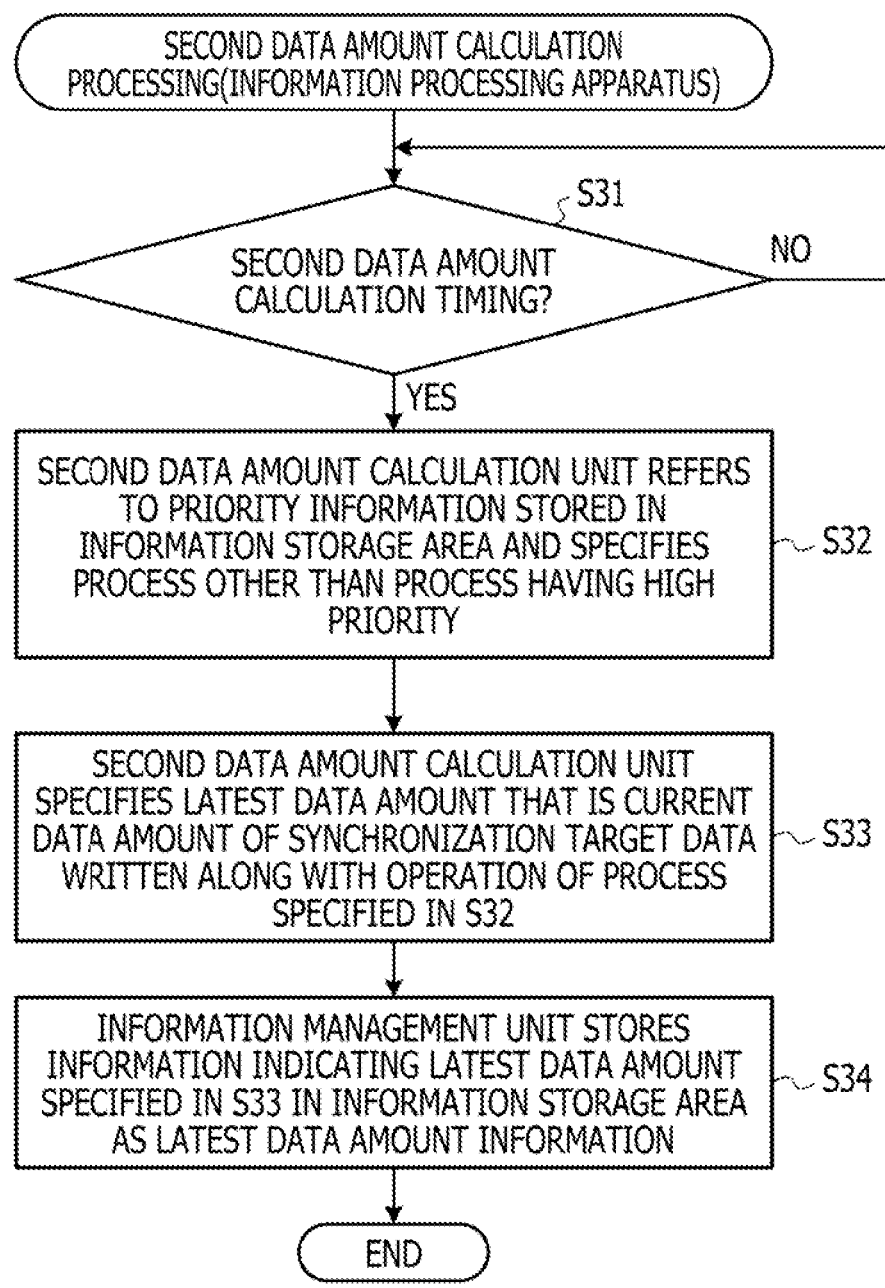
FIG. 13 is a flowchart diagram explaining the synchronization control processing in the first embodiment in detail.

Next, processing of calculating the latest data amount (hereinafter, also referred to as second data amount calculation processing) in the synchronization control processing will be described. FIG. 13 is a flowchart diagram explaining the second data amount calculation processing.

As illustrated in FIG. 13, the second data amount calculation unit 114 of the information processing apparatus 1 waits until a second data amount calculation timing (NO in S31). The second data amount calculation timing may be, for example, a periodic timing such as every 10 minutes.

In a case where the second data amount calculation timing arrives (YES in S31), the second data amount calculation unit 114 refers to the priority information 131 stored in the information storage area 130 and specifies a process other than the process having the high priority (S32).

For example, in the priority information 131 described with reference to FIG. 15, "50", which is the maximum value, is set in the "priority" of information in which the "group name" is "Group-01" (information having the "item number" of "1"). Therefore, for example, the second data amount calculation unit 114 specifies a process corresponding to a group having the group name other than Group-01 in the priority information 131 described with reference to FIG. 15.

Thereafter, the second data amount calculation unit 114 specifies the latest data amount that is the current data amount of the synchronization target data DT written along with the operation of the process specified in the processing of S32 (S33). The information management unit 112 stores, for example, information indicating the latest data amount specified in the processing of S33 in the information storage area 130 as the latest data amount information 134 (S34).

For example, the second data amount calculation unit 114 specifies the latest data amount according to the following Equation (2), for example.

$$D_f = \sum_{i=0}^{n-1} d_i - \sum_{j=0}^{m-1} d_{highest\_j} \quad \text{Equation (2)}$$

In Equation (2), $D_f$ represents the latest data amount, n represents the total number of all processes operating in the information processing apparatus 1, m represents the total number of high-priority processes operating in the information processing apparatus 1, $d_{highest\_j}$ represents the current data amount of the synchronization target data DT written along with the operation of the j-th process among the high-priority processes, and $d_i$ indicates the current data amount of the synchronization target data DT written along with the operation of the i-th process among all the processes operating in the information processing apparatus 1. Specific examples of the allowable data amount information 133 and the latest data amount information 134 will be described below.

[Specific Example of Allowable Data Amount Information and Latest Data Amount Information]

FIG. 18 is a diagram explaining a specific example of the allowable data amount information 133 and the latest data amount information 134.

The information illustrated in FIG. 18 includes, as the item, the "item number" in which identification information of each piece of information is set, the "information name" in which a name of each piece of information is set, and the "data amount" in which a data amount corresponding to each piece of information is set.

For example, in the information illustrated in FIG. 18, "allowable data amount information" is set as the "information name" and "6 (GB)" is set as the "data amount" in the information having the "item number" of "1".

In the information illustrated in FIG. 18, "predicted data amount information" is set as the "information name" and "4.2 (GB)" is set as the "data amount" in the information having the "item number" of "2".

[Main Processing of Synchronization Control Processing]

Figure 14:
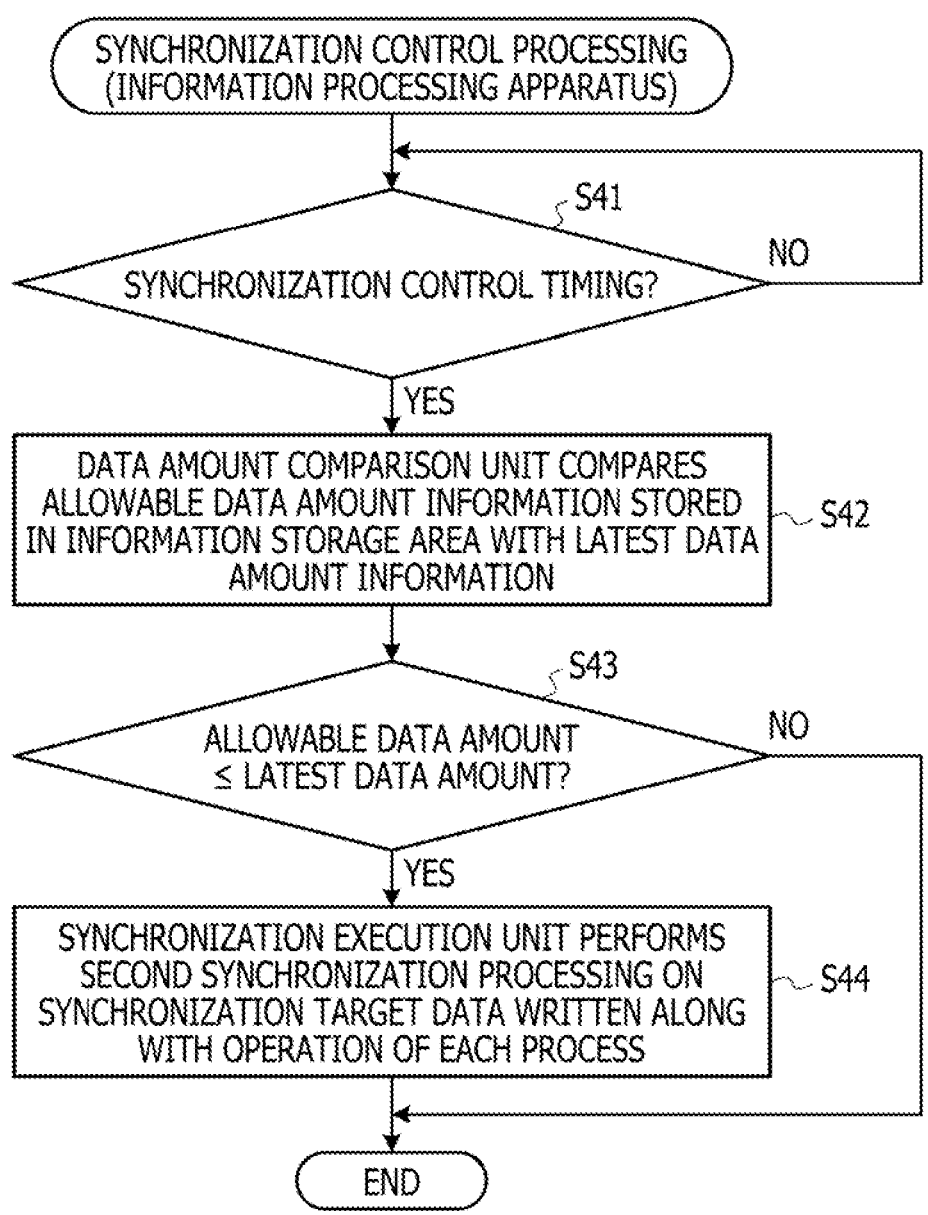
FIG. 14 is a flowchart diagram explaining the synchronization control processing in the first embodiment in detail.

Next, the main processing of the synchronization control processing will be described. FIG. 14 is a flowchart diagram explaining the main processing of the synchronization control processing.

As illustrated in FIG. 14, the data amount comparison unit 115 of the information processing apparatus 1 waits until the synchronization control timing (NO in S41). The synchronization control timing may be, for example, a periodic timing such as every 10 minutes. For example, the synchronization control timing may be a timing immediately after the execution of the second data amount calculation processing ends.

In a case where the synchronization control timing has arrived (YES in S41), the data amount comparison unit 115 compares the data amount corresponding to the allowable data amount information 133 stored in the information storage area 130 with the data amount corresponding to the latest data amount information 134 stored in the information storage area 130 (S42).

For example, in the information described with reference to FIG. 18, "6 (GB)" is set in the "data amount" of the information in which "allowable data amount information" is set in the "information name" (information having the "item number" of "1"), and "4.2 (GB)" is set in the "data amount" of the information in which the "latest data amount information" is set in the "information name" (information having the "item number" of "2"). In this case, the data amount comparison unit 115 determines that the data amount corresponding to the latest data amount information 134 does not reach the data amount corresponding to the allowable data amount information 133.

As a result, in a case where it is determined that the data amount corresponding to the latest data amount information 134 has reached the data amount corresponding to the allowable data amount information 133 (YES in 543), the synchronization execution unit 116 of the information processing apparatus 1 performs the second synchronization processing on the synchronization target data DT written along with the operation of each process (S44).

For example, in this case, the synchronization execution unit 116 performs the synchronization processing on all the synchronization target data DT written along with the operation of each process using the same I/O synchronization infrastructure.

On the other hand, in a case where it is determined that the data amount corresponding to the latest data amount information 134 does not reach the data amount corresponding to the allowable data amount information 133 (NO in 543), the synchronization execution unit 116 does not perform the processing of S44.

In the processing of S42, the data amount comparison unit 115 may compare, for example, the data amount corresponding to the allowable data amount information 133 stored in the information storage area 130 with a data amount obtained by adding a predetermined data amount to the data amount corresponding to the latest data amount information 134 stored in the information storage area 130.

Accordingly, this makes it possible for the information processing apparatus 1 to perform the second synchronization processing before the data amount corresponding to the latest data amount information 134 has reached the data amount corresponding to the allowable data amount information 133.

As described above, the information processing apparatus 1 according to the present embodiment refers to the storage unit in which the allowable time at the execution time of the first synchronization processing performed on the synchronization target data DT written along with the operations of the plurality of processes is stored and calculates the allowable data amount for which synchronization may be performed in the allowable time.

In response to a fact that the latest data amount of the synchronization target data DT written along with the operations of the plurality of processes has reached the allowable data amount, the information processing apparatus 1 performs the second synchronization processing on the synchronization target data DT.

For example, the information processing apparatus 1 performs the second synchronization processing for the purpose of suppressing an increase in the data amount of the synchronization target data DT in addition to the first synchronization processing performed on all the synchronization target data DT. For example, when detecting that the latest data amount of the synchronization target data DT has reached the allowable data amount, the information processing apparatus 1 performs the second synchronization processing prior to the first synchronization processing.

This makes it possible for the information processing apparatus 1 to reduce a delay in the synchronization processing (first synchronization processing) for the synchronization target data DT.

The above embodiments are summarized as follows.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
control execution of synchronization processing of data written along with operations of a plurality of processes;
refer to the memory in which an allowable time at an execution time of first synchronization processing performed on synchronization target data written along with operations of the plurality of processes;
calculate a first data amount for which an executing time of synchronization falls within the allowable time;
perform second synchronization processing on the synchronization target data in response to a fact that a second data amount of the synchronization target data has reached the first data amount;
refer to the memory in which a predicted time taken to perform synchronization on the synchronization target data written along with an operation of a process having a high priority among the plurality of processes is stored to calculate a difference time between the allowable time and the predicted time;
calculate a third data amount for which synchronization is performed in the calculated difference time; and
perform the second synchronization processing on the synchronization target data in response to a fact that a fourth data amount of the synchronization target data written along with an operation of each process other than a process having a high priority among the plurality of processes has reached the third data amount.

2. The information processing apparatus according to claim 1, wherein the processor writes the synchronization target data stored in a first storage area accessible by each of the plurality of processes in a second storage area different from the first storage area.

3. The information processing apparatus according to claim 1, wherein the first synchronization processing is performed in response to a fact that any one of the plurality of processes has instructed execution of the first synchronization processing.

4. The information processing apparatus according to claim 2, wherein the processor calculates the first data amount by multiplying a write processing speed of data with respect to the second storage area by the allowable time.

5. The information processing apparatus according to claim 1, wherein the plurality of processes includes a plurality of processes that each operates along with execution of a plurality of different applications.

6. The information processing apparatus according to claim 5, wherein the plurality of applications includes a plurality of applications each executed in a plurality of different containers.

7. A synchronization control method comprising:
controlling, by a computer, execution of synchronization processing of data to be written along with operations of a plurality of processes;
referring to a memory in which an allowable time at an execution time of first synchronization processing performed on synchronization target data written along with operations of the plurality of processes is stored to calculate a first data amount for which an executing time of synchronization falls within the allowable time; and
performing second synchronization processing on the synchronization target data in response to a fact that a second data amount of the synchronization target data has reached the first data amount,
calculating the first data amount includes:
referring to a memory in which a predicted time taken to perform synchronization on the synchronization target data written along with an operation of a process having a high priority among the plurality of processes is stored to calculate a difference time between the allowable time and the predicted time;
calculating a third data amount for which synchronization is performed in the calculated difference time; and
performing the second synchronization processing on the synchronization target data in response to a fact that a fourth data amount of the synchronization target data written along with an operation of each process other than a process having a high priority among the plurality of processes has reached the third data amount.

8. A non-transitory computer-readable recording medium having stored therein a synchronization control program for causing a computer to execute a process, the process comprising:

controlling execution of synchronization processing of data written along with operations of a plurality of processes;

referring to a memory in which an allowable time at an execution time of first synchronization processing performed on synchronization target data written along with operations of the plurality of processes is stored to calculate a first data amount for which an executing time of synchronization falls within the allowable time; and performing second synchronization processing on the synchronization target data in response to a fact that a second data amount of the synchronization target data has reached the first data amount, calculating the first data amount includes:

referring to the memory in which a predicted time taken to perform synchronization on the synchronization target data written along with an operation of a process having a high priority among the plurality of processes is stored to calculate a difference time between the allowable time and the predicted time;

calculating a third data amount for which synchronization is performed in the calculated difference time; and performing the second synchronization processing on the synchronization target data in response to a fact that a fourth data amount of the synchronization target data written along with an operation of each process other than a process having a high priority among the plurality of processes has reached the third data amount.

* * * * *